US012621599B2

(12) United States Patent
Freire

(10) Patent No.: US 12,621,599 B2
(45) Date of Patent: May 5, 2026

(54) ON-THE-EAR EAR CUSHION WITH MULTIPLE FOAMS HAVING DIFFERENT PROPERTIES

(71) Applicant: GN AUDIO A/S, Ballerup (DK)

(72) Inventor: Nuno Beleza Freire, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 235 days.

(21) Appl. No.: 18/041,774

(22) PCT Filed: Sep. 15, 2021

(86) PCT No.: PCT/EP2021/075295
§ 371 (c)(1),
(2) Date: Feb. 15, 2023

(87) PCT Pub. No.: WO2022/073735
PCT Pub. Date: Apr. 14, 2022

(65) Prior Publication Data

US 2023/0336908 A1 Oct. 19, 2023

(30) Foreign Application Priority Data

Oct. 9, 2020 (DK) ........................... PA 2020 70681

(51) Int. Cl.
*H04R 1/10* (2026.01)

(52) U.S. Cl.
CPC ......... *H04R 1/1083* (2013.01); *H04R 1/1008* (2013.01)

(58) Field of Classification Search
CPC ...... H04R 1/10; H04R 1/1008; H04R 1/1016; H04R 1/1083; H04R 2201/10
(Continued)

(56) References Cited

U.S. PATENT DOCUMENTS

| | | |
|---|---|---|
| 2,684,067 A | 7/1954 | Lienard |
| 5,509,146 A | 4/1996 | Bryerton, Sr. |

(Continued)

FOREIGN PATENT DOCUMENTS

| | | |
|---|---|---|
| CN | 103108267 A | 5/2013 |
| CN | 203086675 U | 7/2013 |

(Continued)

OTHER PUBLICATIONS

International Search Report (with English translation) and Written Opinion issued in PCT/EP2021/075295, dated Jan. 4, 2022, 14 pages provided.

(Continued)

*Primary Examiner* — Andrew Sniezek
(74) *Attorney, Agent, or Firm* — HSML P.C.

(57) ABSTRACT

Disclosed is a headset, an earphone and an ear cushion for attenuating audio noise by acoustic sealing of the ear. The ear cushion is configured to be arranged on an earphone. The ear cushion is configured to be arranged on the ear of a user when the user is wearing the earphone in its intended position. The ear cushion comprises a first foam having first properties. The ear cushion comprises a second foam having second properties. The second foam is at least partly surrounding the first foam. The second foam is configured to at least partly adjoin/abut at least a part of the user's ear. The first properties and the second properties are different.

10 Claims, 8 Drawing Sheets

(58) Field of Classification Search
USPC ................. 381/71.6, 71.7, 74, 309, 370–372
See application file for complete search history.

(56) References Cited

U.S. PATENT DOCUMENTS

| | | | | |
|---|---|---|---|---|
| 10,187,716 | B1 | 1/2019 | England et al. | |
| 2010/0128884 | A1* | 5/2010 | Sapiejewski | H04R 1/1008 381/371 |
| 2011/0002475 | A1* | 1/2011 | Kimura | H04R 1/1008 2/209 |
| 2013/0177165 | A1* | 7/2013 | Oishi | H04R 1/105 381/74 |
| 2014/0286520 | A1* | 9/2014 | Ogino | H04R 1/1091 381/371 |
| 2015/0326965 | A1* | 11/2015 | Sprague | H04R 25/405 381/317 |
| 2016/0150306 | A1 | 5/2016 | Huang et al. | |
| 2017/0230746 | A1* | 8/2017 | Silvestri | H04R 31/00 |
| 2020/0245055 | A1* | 7/2020 | Bikumala | H04R 1/1058 |
| 2022/0070565 | A1* | 3/2022 | Degraye | H04R 1/028 |
| 2022/0400332 | A1* | 12/2022 | Jordanov | H04R 1/1008 |

FOREIGN PATENT DOCUMENTS

| | | | |
|---|---|---|---|
| DE | 2451427 | A1 | 5/1975 |
| EP | 1921889 | A1 | 5/2008 |
| EP | 2053874 | A1 | 4/2009 |
| EP | 3188494 | A1 | 7/2017 |
| GB | 1504065 | A | 3/1978 |
| GB | 2394166 | A | 4/2004 |

OTHER PUBLICATIONS

Office Action issued in Danish Application No. PA 2020 70681, dated Mar. 17, 2021, 10 pages provided.

Office Action issued in Danish Application No. PA 2020 70681, dated Sep. 28, 2021, 3 pages provided.

Communication issued in European Application No. 21777723.4, mailed May 20, 2025.

* cited by examiner

*Fig. 5a)*
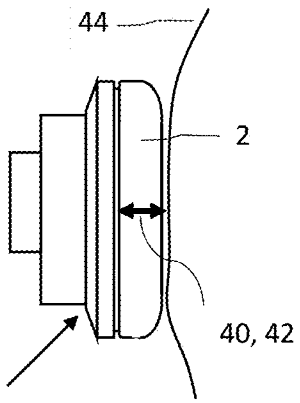
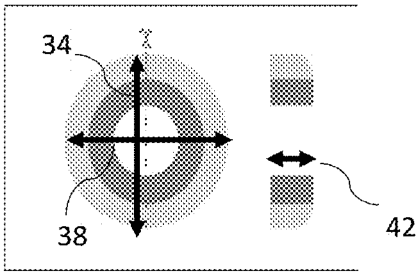
*Fig. 5b)*

ON-THE-EAR EAR CUSHION WITH MULTIPLE FOAMS HAVING DIFFERENT PROPERTIES

FIELD

The present disclosure relates to a headset, an earphone and an ear cushion for attenuating audio noise by acoustic sealing of the ear. The ear cushion is configured to be arranged on an earphone. The ear cushion is configured to be arranged on the ear of a user when the user is wearing the earphone in its intended position. The ear cushion comprises a first foam having first properties. The ear cushion comprises a second foam having second properties.

BACKGROUND

Headsets may be used for transmitting audio to the user wearing the headset. Besides transmitting audio to the user, the headset may also provide attenuation of audio noise from the surroundings of the user. This attenuation may be passive noise attenuation and/or active noise attenuation, such as active noise cancellation (ANC). Passive noise attenuation may be performed by providing acoustic sealing of the ear and ear canal of a user. Ear cushions are an acoustic component that define the interface between the headset and the user's ears. Ear cushions usually consist of a single foam that has certain acoustic and mechanical properties, wrapped partially or totally in a thin layer of a low-permeability material.

EP3188494 A1 discloses a headphone (1) comprising a first circumaural earphone (2) and a holding member (4) for holding the headphone (1) on the head of the user and forcing the first earphone (2) against the head of the user. The first earphone (2) comprises an earphone housing (8) with a first housing side (12) facing the head (5) of the user when worn, a first ring-shaped ear cushion (9) with a first hardness and a first abutment face (16) for abutting the head of the user. The first ear cushion (9) confines together with the first housing side (12) and the head (5) of the user a first cavity (13). The first earphone (2) comprises on the first housing side (12) beside the first ear cushion (9) a second ear cushion (10) with a second hardness and a second abutment face (17) for abutting the head (5) of the user, and wherein the second ear cushion (10) is having a second hardness, which is larger than first hardness.

There is a need for an improved ear cushion configured for attenuating audio noise by providing acoustic sealing of the ear and ear canal of a user.

SUMMARY

Disclosed is an ear cushion for attenuating audio noise by acoustic sealing of the ear. The ear cushion is configured to be arranged on an earphone. The ear cushion is configured to be arranged on the ear of a user when the user is wearing the earphone in its intended position. The ear cushion comprises a first foam having first properties. The ear cushion comprises a second foam having second properties. The second foam is at least partly surrounding the first foam. The second foam is configured to at least partly adjoin/abut at least a part of the user's ear. The first properties and the second properties are different.

The ear cushion is configured to be arranged on an earphone. The earphone may be an earphone for a headset. The headset may comprise one or two earphones. The one or two earphones may comprise the ear cushion. The user may wear the earphone(s)/headset for listening to audio, such as music or radio. The user may wear the earphone(s)/headset for performing phone call or video conferences with far-end participants. The user may wear the earphone(s)/headset for obtaining noise cancellation of noise/sounds from the surroundings. The earphone(s)/headset may transmit audio to the user's ear(s) and perform noise cancellation of surrounding sounds at the same time.

The ear cushion is configured for attenuating audio noise by providing acoustic sealing of the ear and/or by acoustic sealing of the ear canal of the user. Acoustic sealing may provide that there are no or only very small leaks. Thus, when the ear cushion is resting on the user's ear, the ear cushion provides that there are no leaks or only very small leaks of sound between the ear cushion and the user's skin. This provides that the user's ear will only receive audio which is transmitted electronically through the speaker of the earphone or which is transmitted acoustically by other designed/intended acoustic leaks in the headset. The user's ear will receive no or only very little audio which is leaking between the ear cushion and the skin of the user's ear.

The ear cushion is configured to be arranged on the ear of a user when the user is wearing the earphone in its intended position. Thus, the ear cushion or earphone may be of the type called on-the-ear earphone as opposed to over-the-ear, circumaural, or in-the-ear earphones. The on-the-ear earphone is configured to rest on the ear of the user. This is in contrast to an over-the ear earphone or circumaural earphone which is configured to enclose the entire ear and resting on the user's skin behind the ear on the back of the head and at the hair/head over the ear and at the face close to the ear. The on-the-ear earphone is also in contrast to an in-the ear earphone which is configured to be arranged in the ear canal of the user, such as in the outer portion of the ear canal.

The ear cushion comprises a first foam having first properties. The ear cushion comprises a second foam having second properties. The first foam and the second foam may be different foams. The first foam and the second foam may have different properties. The foam properties may be physical properties.

The second foam is at least partly surrounding the first foam. The second foam may enclose, encase, completely or entirely surround the first foam, or surround at least partly the first foam. The second foam may surround the first foam in a plane, such as in one or two dimensions, not in three dimensions.

The second foam is configured to at least partly adjoin and/or abut at least a part of the user's ear. Thus, the second foam is configured for touching at least at part of the user's ear. If the earphone is an on-the-ear type of earphone then the earphone and thereby the ear cushion is resting on the user's ear when the user is wearing the earphone. Thereby the second foam, which is the outer foam of the ear cushion surrounding the first inner foam, will be adjoining and abutting at least a part of the user's ear.

The first foam may also be configured to at least partly adjoin and/or abut at least a part of the user's ear.

The first foam may be the "inner" foam of the ear cushion. For example, the first foam may be soft, such as softer than the second foam, because the first foam is configured for touching the central part of the outer ear which is harder than the pinna and earlobe. It will provide improved comfort for the user when the first foam is a soft foam as it will be touching the hard cartilage of the ear.

The second foam may be the "outer" foam of the ear cushion. For example, the second foam may be less soft, such as harder than the first foam, because the second foam is configured for touching the pinna and the earlobe of the ear, which are both softer parts of the ear. Thus, it will provide comfort for the user when the second foam is a harder foam as it will be touching the softer cartilage of the ear.

The first properties and the second properties are different. Thus, the first foam and the second foam may be different foams having different properties.

It is an advantage of the ear cushion that it provides an improved acoustic sealing of the ear cushion against the user's outer ear.

It is an advantage to have an ear cushion where two, or more, types of foam are combined with a certain geometry as this can result in an optimal attenuation and acoustic seal.

It is an advantage to use two foams in the ear cushion where the two foams has different properties. The human outer-ear (the pinna) does not have a uniform hardness or uniform surface, and in order to achieve an optimal seal with an on-ear cushion, a single foam limits how well the ear cushion can adapt to the ear.

The second foam may provide that when incoming sound/noise first impinge on the outer second foam this provides removing or reducing the low frequencies of the sound/noise.

It is an advantage that the second foam may have a high density whereby the second foam may be configured to prevent air/sound to pass through the second foam.

It is an advantage that the second foam may be configured to provide attenuation of second frequencies of sound, where the second frequencies are frequencies below a value F, such as frequencies below 1-2 kHz. This is due to the second foam being dense, such as having a high density, such as a density higher than the first foam, and/or due to the second foam having lower air permeability, such as a lower air permeability than the first foam, whereby the second foam may not allow air/sound to pass through the second foam, thereby preventing the low frequencies to pass the second foam.

It is an advantage that the first foam may be soft, such as softer than the second foam, and thereby the first foam may be configured to adapt to the shape of the ear thereby providing an acoustic seal by reducing/preventing leaks between the first foam and the ear.

It is an advantage that the first foam may be configured to provide attenuation of first frequencies of sound, where the first frequencies are frequencies above a value F. The first foam may provide attenuation of the first frequencies of sound, such as frequencies above 1-2 kHz, due to the prevention of leaks between the first foam and the ear, through which the high frequencies would otherwise have passed.

Thus, it is an advantage of the ear cushion that the combination of the two different foams provides both improved acoustic sealing and comfort for the user when wearing the ear cushion of the ear.

Also disclosed is an ear cushion for attenuating audio noise by acoustic sealing of the ear, the ear cushion being configured to be arranged on an earphone, the ear cushion is configured to be arranged on the ear of a user when the user is wearing the earphone in its intended position, the ear cushion comprising:

a first foam having first properties; and a second foam having second properties;

where the second foam is at least partly surrounding the first foam, where the second foam is configured to at least partly adjoin/abut at least a part of the user's ear; and wherein the first properties and the second properties are different;

wherein the first properties and the second properties are hardness; and wherein the first foam has a first hardness value, where the second foam has a second hardness value, and wherein the second hardness value is higher than the first hardness value.

Also disclosed is a headset comprising at least one earphone having an ear cushion according to any of the disclosed embodiments.

The headset may comprise one or two earphones. The earphone(s) comprises the ear cushion as disclosed above and in the following. The earphone(s) may comprise a speaker housing. A speaker may be provided in the speaker housing for transmitting audio to the user's ear(s). The headset may further comprise a microphone, such as a microphone boom arm, for capturing the voice of the user. The earphone(s) may be arranged on a headband configured to be arranged on the head of the user, when the user is wearing the headset in its intended position on the head. The headband may have an earphone in each end, i.e. the headset may comprise two earphones. The headset may have one earphone in one end, i.e. the headset may comprise one earphone. If the headset comprises a microphone boom arm, the microphone boom arm may be arranged on the headband, such as in connection with the speaker housing.

In some embodiments, the second foam is at least partly surrounding the first foam in a first plane parallel to the ear/head of the user. The second foam may completely surround the first foam in the first plane. The second foam may partly surround the first foam in the first plane.

In some embodiments, the first foam and the second foam are concentric to each other. Thus, first foam and the second foam may be sharing the same centre point or same axis. The first foam and the second foam may be coaxial, and/or circular symmetrical etc. The first foam and the second foam may be exactly concentric to each other, or there may be an offset between the centres of the first foam and the second foam.

In some embodiments, the first foam has an outer circumference, and the second foam has an inner circumference, and the outer circumference of the first foam abuts the inner circumference of the second foam. Thus, the two foams may be abutting tightly, may be matching each other, may have completely corresponding surfaces etc. This provides a tight fit between the two foams to seal the two foams together and to prevent leak channels between the two foams. The two foams may be glued together. The first foam and/or the second foam may be glued to the speaker housing of the earphone.

The first foam may also have an inner circumference, e.g. if there is a hole in the centre of the first foam exposing the speaker. The first foam may be disk shaped, such as only having an outer circumference and no inner circumference.

The second foam may also have an outer circumference which defines the outer edge of the ear cushion.

The first foam and the second foam may be ring-shaped.

In some embodiments, the first foam and the second foam are shaped as circles, cylinders, polygons, or spheres. Thus, the first foam and the second foam may e.g. be round or oval or elliptical. The first foam and the second foam may have the same shape, such as the same type of shape. The first foam and the second foam may have different shapes, such as different types of shape. The first foam and the second foam may have different sizes. The first foam may be smaller than the second foam.

In some embodiments, the ear cushion has a first length in a first direction of between about 4 cm to about 8.5 cm, and a second length in a second direction of between about 4 cm to about 8.5 cm. Thus, the first length in the first direction may be in the range of between about 4 cm to about 8.5 cm, such as between about 4.5 cm to about 8 cm, between about 5 cm to about 7.5 cm, between about 5.5 cm to about 7 cm, between about 6 cm to about 6.5 cm. Thus, the second length in the second direction may be in the range of between about 4 cm to about 8.5 cm, such as between about 4.5 cm to about 8 cm, between about 5 cm to about 7.5 cm, between about 5.5 cm to about 7 cm, between about 6 cm to about 6.5 cm.

The first length may be termed the length of the ear cushion.

The second length may be termed the width of the ear cushion.

The first length in the first direction may be substantially equal to the second length in the second direction, thus the ear cushion may be circular.

The first length in the first direction may be larger than the second length in the second direction. The first length in the first direction may be smaller than the second length in the second direction. Thus, the ear cushion may be elliptical or oval.

The first length of the ear cushion may be distributed evenly between the first foam and the second foam. The first length of the ear cushion may be distributed unevenly between the first foam and the second foam. Thus, the size of the first foam in the first length of the ear cushion may be about half of the first length. Thus, the size of the first foam in the first length of the ear cushion may be less than half of the first length. Thus, the size of the first foam in the first length of the ear cushion may be more than half of the first length. Thus, the size of the second foam in the first length of the ear cushion may be about half of the first length. Thus, the size of the second foam in the first length of the ear cushion may be less than half of the first length. Thus, the size of the second foam in the first length of the ear cushion may be more than half of the first length.

The second length of the ear cushion may be distributed evenly between the first foam and the second foam. The second length of the ear cushion may be distributed unevenly between the first foam and the second foam. Thus, the size of the first foam in the second length of the ear cushion may be about half of the second length. Thus, the size of the first foam in the second length of the ear cushion may be less than half of the second length. Thus, the size of the first foam in the second length of the ear cushion may be more than half of the second length. Thus, the size of the second foam in the second length of the ear cushion may be about half of the second length. Thus, the size of the second foam in the second length of the ear cushion may be less than half of the second length. Thus, the size of the second foam in the second length of the ear cushion may be more than half of the second length.

The first foam may have an outer circumference and an inner circumference. The second foam may have an inner circumference and an outer circumference. The first foam and the second foam may be ring-shaped.

The length of the first foam at its outer circumference in the first length of the ear cushion may be about 5 cm. The length of the first foam at its outer circumference in the second length of the ear cushion may be about 5 cm.

The length of the first foam at its inner circumference in the first length of the ear cushion may be about 2.5 cm. The length of the first foam at its inner circumference in the second length of the ear cushion may be about 2.5 cm.

Thus, the size of the first foam in the first length and in the second length may be about 2.5 cm.

The length of the second foam at its outer circumference in the first length of the ear cushion may be about 7.5 cm. The length of the second foam at its outer circumference in the second length of the ear cushion may be about 6.5 cm.

The length of the second foam at its inner circumference in the first length of the ear cushion may be about 5 cm. The length of the second foam at its inner circumference in the second length of the ear cushion may be about 5 cm.

Thus, the size of the second foam in the first length may be about 2.5 cm. The size of the second foam in the second length may be about 1.5 cm.

The ear cushion may also have third length in a third direction of between about 0.5 cm to about 3.0 cm. Thus, the third length in the third direction may be in the range of between about 0.5 cm to about 3.0 cm, such as between about 1.0 cm to about 2.5 cm, such as between about 1.5 cm to about 2.0 cm.

The third length may be termed the thickness of the ear cushion.

The first direction may be a substantially vertical direction when the ear cushion is arranged on the user's ear in its intended position. Thus, the first direction may be along the longitudinal direction of the outer ear, such as from the ear lobe towards the helix.

The second direction may be a substantially horizontal direction when the ear cushion is arranged on the user's ear in its intended position. Thus, the second direction may be along the transversal direction of the outer ear, such as from the tragus towards the antihelix.

The first direction and the second direction may be perpendicular to each other, such as substantially perpendicular to each other.

The first direction and the second direction may be parallel, such as substantially parallel, to the plane of the user's ear/head, when the ear cushion is arranged on the user's ear in its intended position.

The third direction may be perpendicular to the first direction and to the second direction, such as substantially perpendicular.

Thus, the third direction may be extending from a plane of the outer ear defined by the tragus and the antihelix outwards towards the surroundings, when the ear cushion is arranged on the user's ear in its intended position. The third direction may be substantially perpendicular to the plane of the user's ear/head, when the ear cushion is arranged on the user's ear in its intended position.

The first length in the first direction may be larger than the third length in the third direction. The second length in the second direction may be larger than the third length in the third direction.

In some embodiments, the ear cushion is configured to cover the ear canal, at least a part of the concha, at least a part of the tragus, at least a part of the anti-tragus, and/or at least a part of the anti-helix of the ear. In some embodiments, the ear cushion is configured to expose at least a part of the helix and/or at least a part of the ear lobe. Thus, the ear cushion may be an on-the-ear ear cushion. Thus, the ear cushion is not configured to enclose the ear, such as enclosing the helix, ear lobe etc. Thus, the ear cushion may not be configured to be an over-the-ear ear cushion or in in-the-ear ear cushion.

In some embodiments, the first properties and the second properties are one or more of:

thickness, and/or memory, and/or density; and/or air permeability; and/or hardness.

The first foam and the second foam may be open-cell foams, memory foams, polyester foams, plastic foams etc. The second foam may be a so-called YM-80 foam. The first foam may be a so-called YM635 foam. The first foam and second foam may be made of materials such as propylene oxide polymer, ethylene oxide polymer, and/or toluene diisocyanate (TDI).

The first foam may have a first thickness value, and the second foam may have a second thickness value. The second thickness value may be higher than the first thickness value. Alternatively, the second thickness value may be equal to or lower than the first thickness value.

The first foam may have a first memory value, and the second foam may have a second memory value. The second memory value may be higher than the first memory value. Alternatively, the second memory value may be equal to or lower than the first memory value.

The first foam may have a first density value, and the second foam may have a second density value. The second density value may be higher than the first density value. Alternatively, the second density value may be equal to or lower than the first density value.

The first foam may have a first air permeability value, and the second foam may have a second air permeability value. The second air permeability value may be lower than the first air permeability value. Alternatively, the second air permeability value may be equal to or higher than the first air permeability value.

The first foam may have a first hardness value, and the second foam may have a second hardness value. The second hardness value may be higher than the first hardness value. Alternatively, the second hardness value may be equal to or lower than the first hardness value.

Thus, in some embodiments, the first foam has a first hardness value, the second foam has a second hardness value, and wherein the second hardness value is higher than the first hardness value. Thus, the second foam may be harder than the first foam.

In some embodiments, the second hardness value is in the range of about 15-30 Asker F, and the first hardness value is in the range of about 3-15 Asker F.

Thus, in some embodiments, the first foam has a first density value, the second foam has a second density value, and wherein the second density value is higher than the first density value. Thus, the second may be denser than the first foam.

In some embodiments, the second density value is in the range of about 75-85 kg/m$^3$, and wherein the first density value is in the range of about 55-65 kg/m$^3$.

In some embodiments, the first foam is configured to adapt to the shape of the ear thereby providing an acoustic seal by reducing/preventing leaks between the first foam and the ear. This may be due to that the first foam has a relatively low hardness value. It is an advantage that the first foam may be soft, such as softer than the second foam, and thereby the first foam may be configured to adapt to the shape of the ear thereby providing an acoustic seal by reducing/preventing leaks between the first foam and the ear.

In some embodiments, the first foam is configured to provide attenuation of first frequencies of sound, where the first frequencies are frequencies above a value F. It is an advantage that the first foam may be configured to provide attenuation of first frequencies of sound, where the first frequencies are frequencies above a value F. The first foam may provide attenuation of the first frequencies of sound, such as frequencies above 1-2 kHz, due to the prevention of leaks between the first foam and the ear, through which the high frequencies would otherwise have passed.

In some embodiments, the second foam is configured to prevent air/sound to pass through the second foam. This may be due to that the second foam has a relatively high density and/or due to that the second foam has a relatively low air permeability. It is an advantage that the second foam may have a high density whereby the second foam may be configured to prevent air/sound to pass through the second foam.

In some embodiments, the second foam is configured to provide attenuation of second frequencies of sound, where the second frequencies are frequencies below a value F. It is an advantage that the second foam may be configured to provide attenuation of second frequencies of sound, where the second frequencies are frequencies below a value F, such as frequencies below 1-2 kHz. This is due to the second foam being dense, such as having a relatively high density, such as a density higher than the first foam, and/or due to that the second foam has lower air permeability, such as an air permeability lower than the first foam, whereby the second foam may not allow air/sound to pass through the second foam, thereby preventing the low frequencies to pass the second foam.

In some embodiments, the ear cushion is configured to be arranged on a speaker housing of the earphone. In some embodiments, the second foam is at least partly surrounding the speaker housing of the earphone.

The speaker housing may comprise a plate. The speaker may be arranged in the centre of the plate. The speaker may protrude/point towards a first face of the plate. The ear cushion may be arranged on the first face of the plate. The first face of the plate is configured to point towards the ear of the user when the user is wearing the earphone in its intended position on the ear.

The speaker housing may comprise a flat plane and a protrusion extending from the plate. The ear cushion may be configured to be follow/adapt to at least a part of the shape of the speaker housing. The second foam may configured to be shaped to follow/adapt to at least a part of the plate and/or to at least a part of the protrusion of the speaker housing.

In some embodiments, the ear cushion comprises a cover protecting the first foam and the second foam. The cover may be made of a material such as a fabric or textile, such as leatherette.

The present invention relates to different aspects including the ear cushion described above and in the following, and corresponding ear cushions, earphones, headsets, hearing devices, systems, system parts, methods, devices, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIGS. 5*a* and 5*b* schematically illustrate an example of an ear cushion comprising a first foam and a second foam.

DETAILED DESCRIPTION

Figure 1:
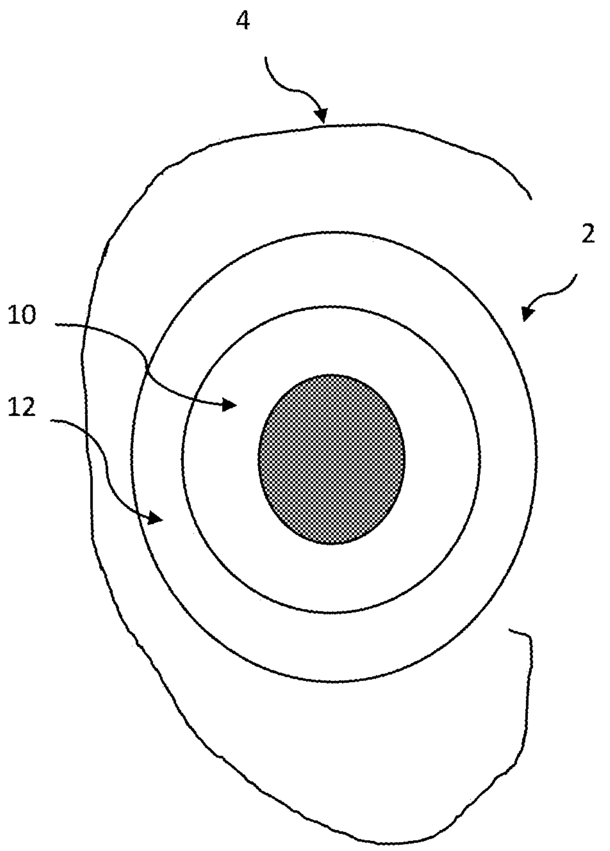
FIG. 1 schematically illustrates an example of an ear cushion for attenuating audio noise by acoustic sealing of the ear.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of an ear cushion 2 for attenuating audio noise by acoustic sealing of the ear 4. The ear cushion 2 is configured to be arranged on an earphone (not shown). The ear cushion 2 is configured to be arranged on the ear 4 of a user (not shown) when the user is wearing the earphone in its intended position. The ear cushion 2 comprises a first foam 10 having first properties. The ear cushion 2 comprises a second foam 12 having second properties. The second foam 12 is at least partly surrounding the first foam 10. The second foam 12 is configured to at least partly adjoin/abut at least a part of the user's ear 4. The first properties of the first foam and the second properties of the second foam are different.

FIG. 1 further shows that the second foam 12 is at least partly surrounding the first foam in a first plane parallel to the ear 4/head of the user.

Figure 2:
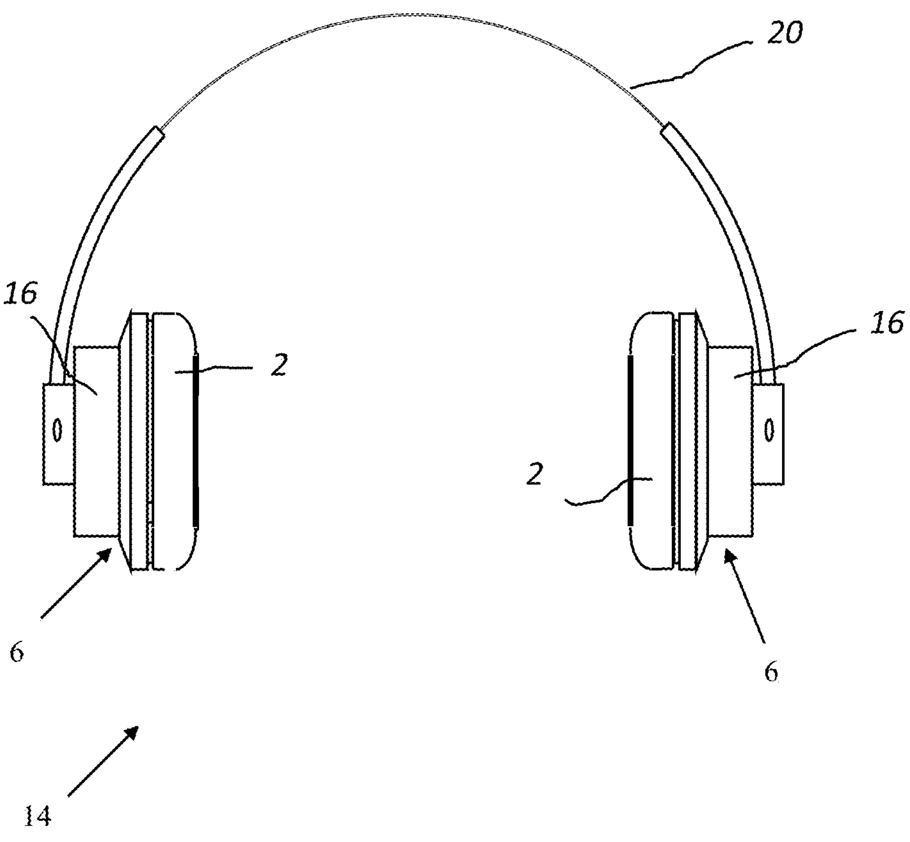
FIG. 2 schematically illustrates an example of a headset comprising an earphone having an ear cushion.

FIG. 2 schematically illustrates an example of a headset 14 comprising an earphone 6 having an ear cushion 2.

The headset 14 comprises one earphone 6 or two earphones 6. In FIG. 2, the headset 14 has two earphones, one for each ear of the user. The earphone(s) 6 comprises the ear cushion 2 as disclosed above and in the following. The earphone(s) 6 comprises a speaker housing 16. A speaker (not shown) is provided in the speaker housing 16 for transmitting audio to the user's ear(s). The headset 14 may further comprise a microphone (not shown), such as a microphone boom arm (not shown), for capturing the voice of the user. The earphone(s) 6 may be arranged on a headband 20 configured to be arranged on the head of the user, when the user is wearing the headset 14 in its intended position on the head. The headband 20 may have an earphone 6 in each end, i.e. the headset 14 may comprise two earphones 6, or the headband 20 may have only one earphone 6 in one of the ends. If the headset 14 comprises a microphone boom arm, the microphone boom arm may be arranged on the headband 20, such as in connection with the speaker housing 16.

Figure 3:
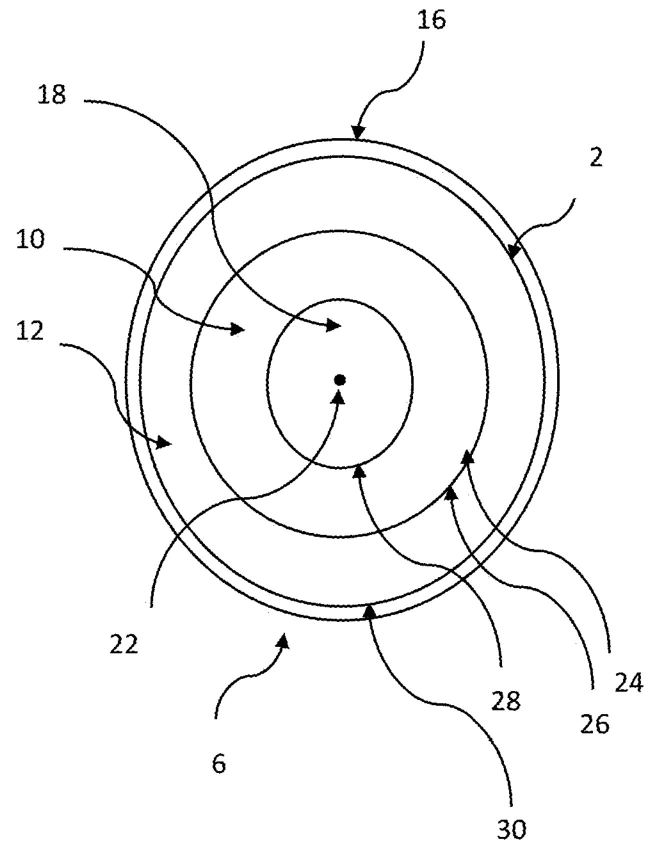
FIG. 3 schematically illustrates an example of an earphone comprising an ear cushion having a first foam and a second foam.

FIG. 3 schematically illustrates an example of an earphone 6 comprising an ear cushion 2 having a first foam 10 and a second foam 12. The earphone 6 comprises a speaker housing 16. A speaker 18 is provided in the speaker housing 16 for transmitting audio to the user's ear. The first foam 10 and/or the second foam 12 may be glued to the speaker housing 16 of the earphone 6.

The second foam 12 is at least partly surrounding the first foam 10.

The first foam 10 and the second foam 12 are concentric to each other. Thus, first foam and the second foam may be sharing the same centre point 22 or same axis 22. The first foam 10 and the second foam 12 may be coaxial, and/or circular symmetrical. The first foam 10 and the second foam 12 may be exactly concentric to each other, or there may be an offset between the centres of the first foam 10 and the second foam 12.

The first foam 10 has an outer circumference 24, and the second foam 12 has an inner circumference 26, and the outer circumference 24 of the first foam 10 abuts the inner circumference 26 of the second foam 12. Thus, the two foams may be abutting tightly, may be matching each other, may have completely corresponding surfaces etc.

The first foam 10 may also have an inner circumference 28, e.g. if there is a hole in the centre of the first foam 10 exposing the speaker 18.

The second foam 12 may also have an outer circumference 30 which defines the outer edge of the ear cushion 2.

The first foam 10 and the second foam 12 are be ring-shaped. The first foam 10 and the second foam 12 are shaped as cylinders. The first foam 10 and the second foam 12 are round or oval or elliptical. The first foam 10 and the second foam 12 may have the same shape, such as the same type of shape. The first foam 10 and the second foam 12 have different sizes. The first foam 10 is smaller than the second foam 12.

Figure 4:
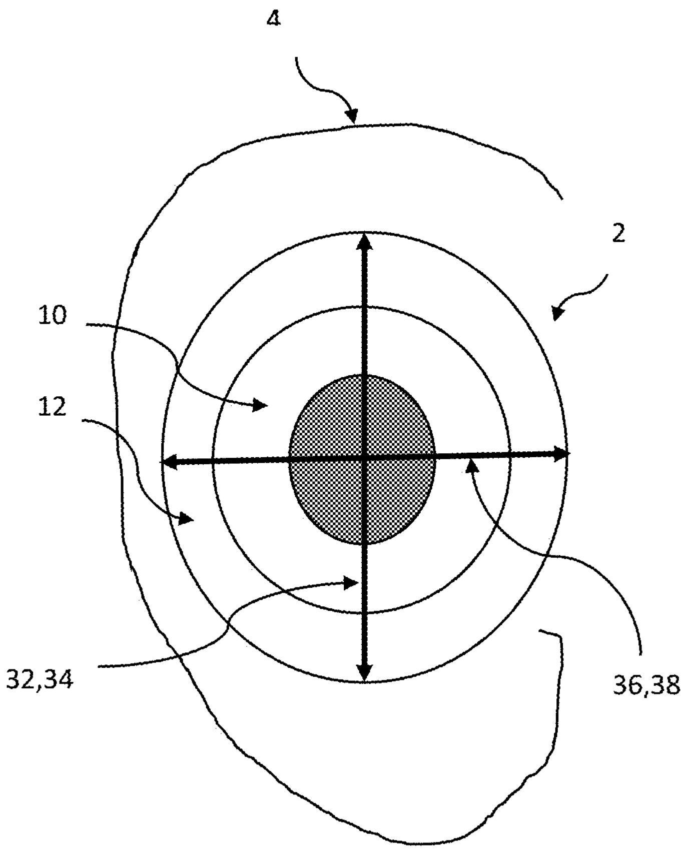
FIG. 4 schematically illustrates an example of an ear cushion comprising a first foam and a second foam.

FIG. 4 schematically illustrates an example of an ear cushion 2 comprising a first foam and a second foam 12. The ear cushion 2 is configured to be arranged on a user's ear 4.

The second foam 12 is at least partly surrounding the first foam 10 in a first plane parallel to the ear 4/head of the user.

The ear cushion 2 has a first length 32 in a first direction 34. The first length may be between about 4 cm to about 8.5 cm.

The ear cushion 2 has a second length 36 in a second direction 38. The second length may be between about 4 cm to about 8.5 cm.

Thus, the first length 32 may be equal to or longer than or shorter than the second length 36.

The first length 32 may be termed the length of the ear cushion 2.

The second length 36 may be termed the width of the ear cushion 2.

The first direction 34 may be a substantially vertical direction when the ear cushion 2 is arranged on the user's ear 4 in its intended position. Thus, the first direction 34 may be along the longitudinal direction of the outer ear 4, such as from the ear lobe towards the helix.

The second direction 38 may be a substantially horizontal direction when the ear cushion 2 is arranged on the user's ear 4 in its intended position. Thus, the second direction 38 may be along the transversal direction of the outer ear 4, such as from the tragus towards the antihelix.

The first direction 34 and the second direction 38 may be perpendicular to each other, such as substantially perpendicular to each other.

The first direction 34 and the second direction 38 may be parallel, such as substantially parallel, to the plane of the user's ear 4/head, when the ear cushion 2 is arranged on the user's ear 4 in its intended position.

FIGS. 5*a*) and 5*b*) schematically illustrate an example of an ear cushion 2 comprising a first foam 10 and a second foam 12.

FIG. 5*a*) illustrates an earphone 6 comprising an ear cushion 2. The ear cushion 2 has a third length 40 in a third direction 42. The third length may be between about 0.5 cm to about 3.0 cm.

The third length 40 may be termed the thickness of the ear cushion 2.

FIG. 5*b*) illustrates that the third direction 42 may be perpendicular to the first direction 34 and to the second direction 38, such as substantially perpendicular.

Thus, the third direction 42 may be extending from a plane of the outer ear defined by the tragus and the antihelix outwards towards the surroundings, when the ear cushion is arranged on the user's ear in its intended position. The third direction 42 may be substantially perpendicular to the plane 44 of the user's head, when the ear cushion 2 is arranged on the user's ear in its intended position, see e.g. FIG. 4.

The first length 32 in the first direction 34 may be larger than the third length in the third direction. The second length in the second direction may be larger than the third length in the third direction.

Figure 6:
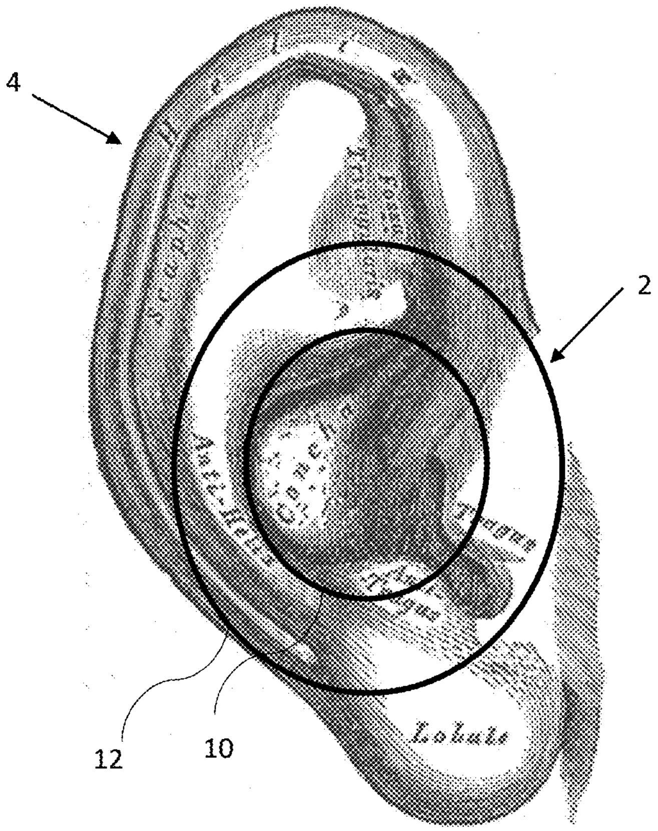
FIG. 6 schematically illustrates an example of an ear cushion on an ear.

FIG. 6 schematically illustrates an example of an ear cushion 2 on an ear 4.

The ear cushion 2 is for attenuating audio noise by acoustic sealing of the ear 4. The ear cushion 2 is configured to be arranged on an earphone. The ear cushion 2 is configured to be arranged on the ear 4 of a user when the user is wearing the earphone in its intended position. The ear cushion comprises a first foam 10 having first properties. The ear cushion 2 comprises a second foam 12 having second properties. The second foam 12 is at least partly surrounding the first foam 10. The second foam 12 is configured to at least partly adjoin/abut at least a part of the user's ear 4. The first foam 10 is configured to at least partly adjoin/abut at least a part of the user's ear 4.

The ear cushion 2 is configured to cover the ear canal, at least a part of the concha, at least a part of the tragus, at least a part of the anti-tragus, and/or at least a part of the anti-helix of the ear.

The ear cushion 2 is configured to expose at least a part of the helix and/or at least a part of the ear lobe.

The ear cushion 2 is configured to be arranged on the ear 4 of a user when the user is wearing the earphone in its intended position. Thus, the ear cushion 2 or earphone may be of the type called on-the-ear as opposed to over-the-ear or in-the-ear. The on-the-ear is configured to rest on the ear 4 of the user. This is in contrast to an over-the ear earphone which is configured to enclose the entire ear and resting on the user's skin behind the ear on the back of the head and at the hair/head over the ear and at the face close to the ear. The on-the-ear earphone is also in contrast to an in-the ear earphone which is configured to be arranged in the ear canal of the user, such as in the outer portion of the ear canal.

The ear cushion 2 is configured for attenuating audio noise by providing acoustic sealing of the ear 4 and/or by acoustic sealing of the ear canal of the user. Acoustic sealing may provide that there are no or only very small leaks. Thus, when the ear cushion 2 is resting on the user's ear 4, the ear cushion 2 provides that there are no leaks or only very small leaks of sound between the ear cushion 2 and the user's skin. This provides that the user's ear 4 will only receive audio which is transmitted electronically through the speaker of the earphone. The user's ear 4 will receive no or only very little audio which is leaking between the ear cushion 2 and the skin of the user's ear 4.

The second foam 12 is configured to at least partly adjoin and/or abut at least a part of the user's ear 4. Thus, the second foam 12 is configured for touching at least at part of the user's ear 4. If the earphone is an on-the-ear type of earphone then the earphone and thereby the ear cushion 2 is resting on the user's ear 4 when the user is wearing the earphone. Thereby the second foam 12, which is the outer foam of the ear cushion surrounding the first inner foam 10, will be adjoining and abutting at least a part of the user's ear 4.

The first foam 10 may also be configured to at least partly adjoin and/or abut at least a part of the user's ear 4.

The first foam 10 may be the "inner" foam of the ear cushion 2. For example, the first foam 10 may be soft, such as softer than the second foam 12, because the first foam is configured for touching the central part of the outer ear 4 which is harder than the pinna and earlobe. It will provide improved comfort for the user when the first foam 10 is a soft foam as it will be touching the hard cartilage of the ear 4.

The second foam 12 may be the "outer" foam of the ear cushion 2. For example, the second foam 12 may be less soft, such as harder than the first foam 10, because the second foam 12 is configured for touching the pinna and the earlobe of the ear, which are both softer parts of the ear 4. Thus, it will provide comfort for the user when the second foam 12 is a harder foam as it will be touching the softer cartilage of the ear 4.

The ear cushion 2 provides an improved acoustic sealing of the ear cushion 2 against the user's outer ear 4.

The ear cushion 2 has two, or more, types of foam combined with a certain geometry which can result in an optimal attenuation and acoustic seal.

The second foam 12 may provide that when incoming sound/noise first impinge on the outer second foam 12 this provides removing or reducing the low frequencies of the sound/noise.

The second foam 12 may have a high density whereby the second foam 12 may be configured to prevent air/sound to pass through the second foam 12.

The second foam 12 may be configured to provide attenuation of second frequencies of sound, where the second frequencies are frequencies below a value F, such as frequencies below 1-2 kHz. This is due to the second foam 12 being dense, such as having a high density, such as a density higher than the first foam 10, whereby the second foam 12 may not allow air/sound to pass through the second foam 12, thereby preventing the low frequencies to pass the second foam 12.

The first foam 10 may be soft, such as softer than the second foam 12, and thereby the first foam 10 may be configured to adapt to the shape of the ear 4 thereby providing an acoustic seal by reducing/preventing leaks between the first foam 10 and the ear 4.

The first foam 10 may be configured to provide attenuation of first frequencies of sound, where the first frequencies are frequencies above a value F. The first foam 10 may provide attenuation of the first frequencies of sound, such as frequencies above 1-2 kHz, due to the prevention of leaks between the first foam 10 and the ear 4, through which the high frequencies would otherwise have passed.

The combination of the two different foams of the ear cushion 2 provides both improved acoustic sealing and comfort for the user when wearing the ear cushion 2 of the ear 4.

Figure 7:
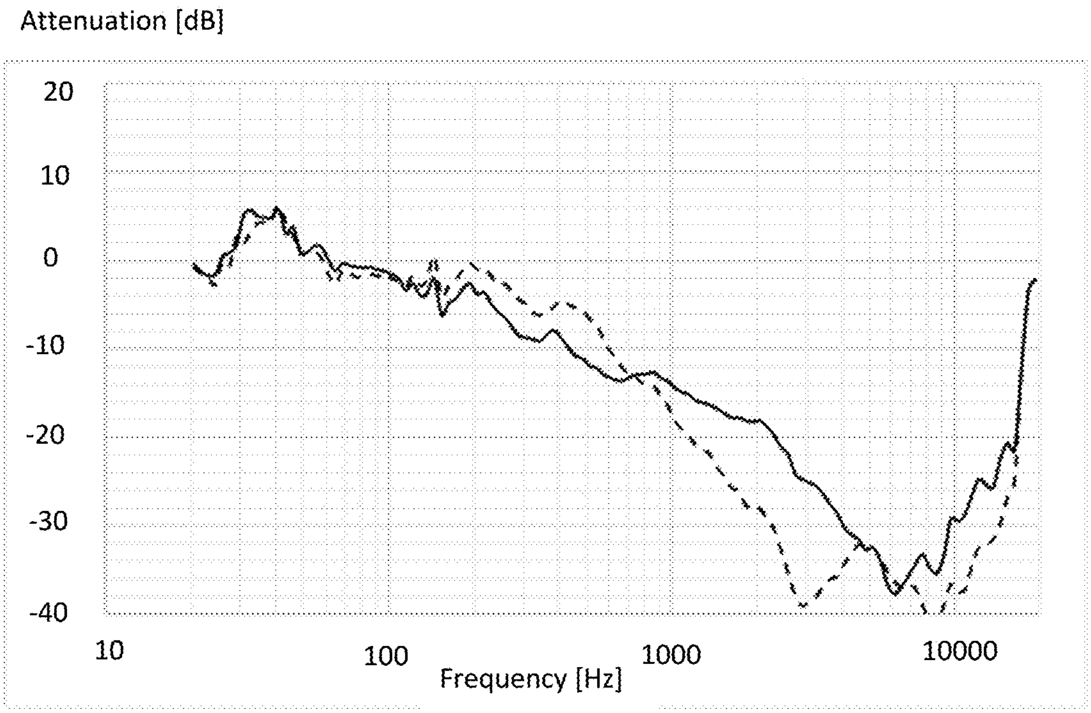
FIG. 7 schematically illustrates measurements of attenuation curves for ear cushions having different foam material.

FIG. 7 schematically illustrates by measurements that ear cushions where the only difference is the foam material provide very different attenuation curves. The x-axis shows the frequencies of sound/noise in Hz. The y-axis shows the attenuation of sound/noise in dB provided by the ear cushion foam. The two graphs are measurement of two different foams. The full-line graph illustrates a harder foam, such as the second foam, and it can be seen that the harder foam provides more attenuation for frequencies below F, such as below about 700 Hz. The dashed-line graph illustrates a softer foam, such as the first foam, and it can be seen that the softer foam provides more attenuation for frequencies above F, such as above about 700 Hz.

The frequency F may also be about 1-2 kHz.

Thus, from this figure is can be seen that having an ear cushion where two (or more) types of foam are combined with a certain geometry can result in an optimal attenuation/acoustic seal.

Figure 8A:
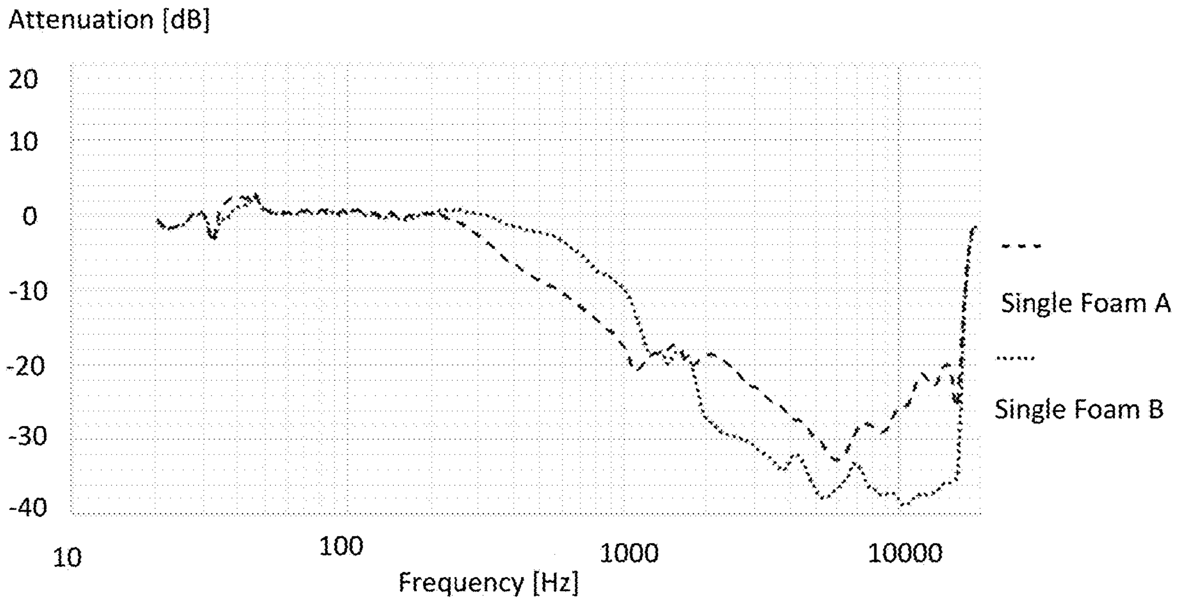
FIGS. 8*a* and 8*b* schematically illustrate measurements of attenuation curves for ear cushions having different foam material.
Figure 8B:
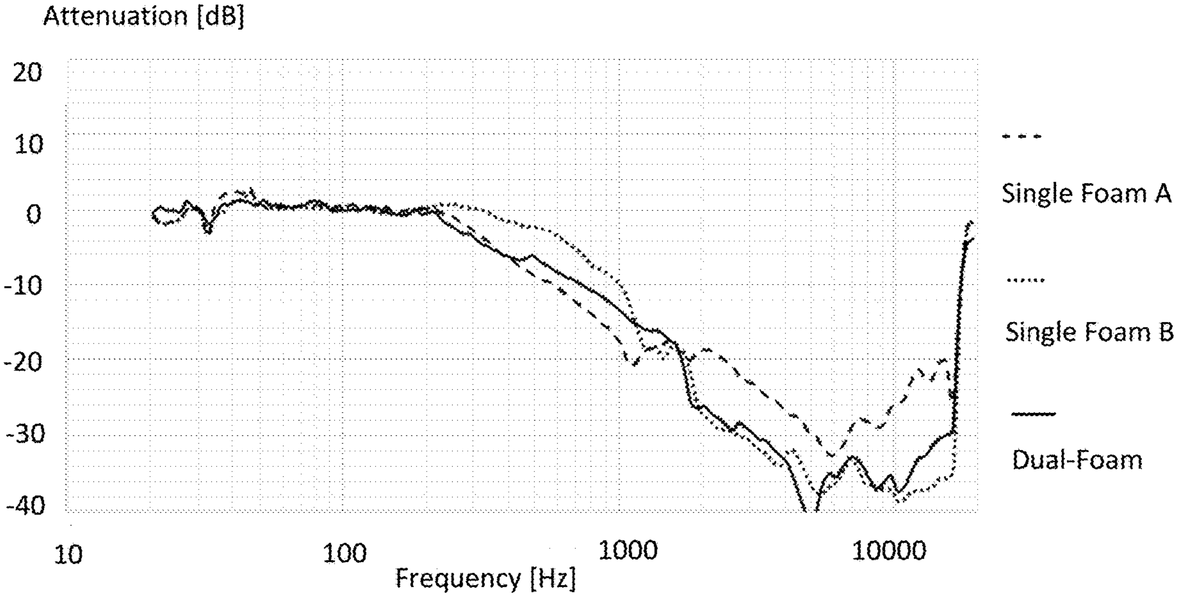

FIGS. 8*a* and 8*b* schematically illustrate by measurements that ear cushions where the only difference is the foam material provide very different attenuation curves. The x-axis shows the frequencies of sound/noise in Hz. The y-axis shows the attenuation of sound/noise in dB provided by the ear cushion foam.

In FIG. 8*a*, the two graphs are measurement of two different foams. The dashed-line graph illustrates a harder foam "Single Foam A", such as the second foam, and it can be seen that the harder foam provides more attenuation for frequencies below F, such as below about 1000 Hz. The dotted-line graph illustrates a softer foam "Single Foam B", such as the first foam, and it can be seen that the softer foam provides more attenuation for frequencies above F, such as above about 1000 Hz.

The frequency F may also be about 1-2 kHz.

Thus, from this figure is can be seen that having an ear cushion where two (or more) types of foam are combined with a certain geometry can result in an improved attenuation/acoustic seal.

The two different single foams used in this plot is Foam A which is harder and having lower air permeability, and Foam B which is softer and having higher air permeability.

In FIG. 8*b*, the three graphs are measurement of two different single foams and a dual-foam. The dashed-line graph illustrates a harder foam "Single Foam A", such as the second foam, and it can be seen that the harder foam provides more attenuation for frequencies below F, such as below about 1000 Hz. The dotted-line graph illustrates a softer foam "Single Foam B", such as the first foam, and it can be seen that the softer foam provides more attenuation for frequencies above F, such as above about 1000 Hz. The full-line graph illustrates a dual-foam which comprises Foam A on the outer foam and Foam B in the inner foam.

The frequency F may also be about 1-2 kHz.

Thus, from this figure is can be seen that having an ear cushion where two (or more) types of foam are combined with a certain geometry can result in an improved attenuation/acoustic seal.

The two different single foams used in this plot is Foam A which is harder and having lower air permeability, and Foam B which is softer and having higher air permeability. The dual-foam used in this plot comprises Foam A on the outer foam and Foam B in the inner foam.

On top of the advantages of better attenuation, also better comfort is obtained. User tests showed, that harder foam A, when used alone, was not comfortable to use over a prolonged period. User tests also showed that the soft foam B, when used alone, was not so comfortable, as the harder parts of the earphone housing could be felt by the user through the soft foam.

The invention provides a solution, which is very simple to implement. The foams used can be selected and implemented by trial and error without difficulties.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. An ear cushion for attenuating audio noise by acoustic sealing of the ear, the ear cushion being configured to be arranged on an earphone, the ear cushion is configured to be arranged on the ear of a user when the user is wearing the earphone in its intended position, the ear cushion comprising:

a first foam having first properties; and a second foam having second properties;

where the second foam is at least partly surrounding the first foam, where the second foam is configured to at least partly adjoin/abut at least a part of the user's ear; and wherein the first properties and the second properties are different.

2. The ear cushion according to any of the preceding items, wherein the second foam is at least partly surrounding the first foam in a first plane parallel to the ear/head of the user.

3. The ear cushion according to any of the preceding items, wherein the first foam and the second foam are concentric to each other.

4. The ear cushion according to any of the preceding items, wherein the first foam has an outer circumference, and wherein the second foam has an inner circumference, and wherein the outer circumference of the first foam abuts the inner circumference of the second foam.

5. The ear cushion according to any of the preceding items, wherein the first foam and the second foam are shaped as circles, cylinders, polygons, or spheres.

6. The ear cushion according to any of the preceding items, wherein the ear cushion has a first length in a first direction of between about 4 cm to about 8.5 cm, and a second length in a second direction of between about 4 cm to about 8.5 cm.

7. The ear cushion according to any of the preceding items, wherein the ear cushion is configured to cover the ear canal, at least a part of the concha, at least a part of the tragus, at least a part of the anti-tragus, and/or at least a part of the anti-helix of the ear, and wherein the ear cushion is configured to expose at least a part of the helix and/or at least a part of the ear lobe.

8. The ear cushion according to any of the preceding items, wherein the first properties and the second properties are one or more of:

thickness, and/or memory, and/or
density; and/or
air permeability; and/or
hardness.

9. The ear cushion according to any of the preceding items, wherein the first foam has a first hardness value, where the second foam has a second hardness value, and wherein the second hardness value is higher than the first hardness value.

10. The ear cushion according to any of the preceding items, wherein the second hardness value is in the range of about 15-30 Asker F, and the first hardness value is in the range of about 3-15 Asker F.

11. The ear cushion according to any of the preceding items, wherein the first foam has a first density value, where the second foam has a second density value, and wherein the second density value is higher than the first density value.

12. The ear cushion according to any of the preceding items, wherein the second density value is in the range of about 75-85 kg/m3, and wherein the first density value is in the range of about 55-65 kg/m3.

13. The ear cushion according to any of the preceding items, wherein the first foam is configured to adapt to the shape of the ear thereby providing an acoustic seal by reducing/preventing leaks between the first foam and the ear.

14. The ear cushion according to any of the preceding items, wherein the first foam is configured to provide attenuation of first frequencies of sound, where the first frequencies are frequencies above a value F.

15. The ear cushion according to any of the preceding items, wherein the second foam is configured to prevent air/sound to pass through the second foam.

16. The ear cushion according to any of the preceding items, wherein the second foam is configured to provide attenuation of second frequencies of sound, where the second frequencies are frequencies below a value F.

17. The ear cushion according to any of the preceding items, wherein the ear cushion is configured to be arranged on a speaker housing of the earphone, and wherein the second foam is at least partly surrounding the speaker housing of the earphone.

18. The ear cushion according to any of the preceding items, wherein the ear cushion comprises a cover protecting the first foam and the second foam.

19. A headset comprising at least one earphone having an ear cushion according to any of the preceding items.

LIST OF REFERENCES

2 ear cushion
4 ear
6 earphone
10 first foam
12 second foam
14 headset
16 speaker housing
18 speaker
20 headband
22 centre point or centre axis
24 outer circumference if first foam
26 inner circumference of second foam
28 inner circumference of first foam
30 outer circumference of second foam
32 first length
34 first direction
36 second length
38 second direction
40 third length
42 third direction
44 plane of the user's head

The invention claimed is:

1. An ear cushion for attenuating audio noise by acoustic sealing of the ear, the ear cushion is configured to be on an earphone and rest on the ear of a user when the user is wearing the earphone in its intended position, and the ear cushion comprising:
- a first foam having first properties; and
- a second foam having second properties;
  - wherein the second foam is at least partly surrounding the first foam,
  - wherein the second foam is configured to at least partly adjoin or abut at least a part of the user's ear so that the ear cushion rests on the user's ear,
  - wherein the first properties and the second properties are different,
  - wherein the first properties and the second properties are hardness,
  - wherein the first foam has a first hardness value,
  - wherein the second foam has a second hardness value, and
  - wherein the second hardness value is in the range of about 15-30 Asker F and the first hardness value is in the range of about 3-15 Asker F.

2. The ear cushion according to claim 1, wherein the second foam is at least partly surrounding the first foam in a first plane parallel to at least one of the ear or the head of the user.

3. The ear cushion according to claim 1, wherein the first foam and the second foam are concentric to each other.

4. The ear cushion according to claim 1,
- wherein the first foam has an outer circumference,
- wherein the second foam has an inner circumference, and
- wherein the outer circumference of the first foam abuts the inner circumference of the second foam.

5. The ear cushion according to claim 1, wherein the ear cushion has a first length in a first direction of between about 4 cm to about 8.5 cm, and a second length in a second direction of between about 4 cm to about 8.5 cm.

6. The ear cushion according to claim 1,
- wherein the ear cushion is configured to cover at least one of the ear canal, at least a part of a concha, at least a part of a tragus, at least a part of an anti-tragus, or at least a part of an anti-helix of the ear, and
- wherein the ear cushion is configured to expose at least a part of at least one of the helix or a part of an ear lobe.

7. The ear cushion according to claim 1, wherein the first properties and the second properties are one or more of thickness, memory, or density.

8. The ear cushion according to claim 1,
- wherein the first foam is configured to adapt to the shape of the ear thereby providing an acoustic seal by at least one of reducing or preventing leaks between the first foam and the user's ear,
- wherein the first foam is configured to provide attenuation of first frequencies of sound, and
- wherein the first frequencies are frequencies above a value F.

9. The ear cushion according to claim 1,
- wherein the second foam is configured to prevent at least one of air or sound to pass through the second foam,
- wherein the second foam is configured to provide attenuation of second frequencies of sound, and
- wherein the second frequencies are frequencies below a value F.

10. A headset comprising at least one earphone having an ear cushion according to claim 1.

* * * * *